(12) United States Patent
Schweid

(10) Patent No.: US 9,787,871 B2
(45) Date of Patent: Oct. 10, 2017

(54) HIDDEN MARKOV MODEL GENERATION OF MULTI-PLANE RANDOM SCREENS

(71) Applicant: Xerox Corporation, Norwalk, CT (US)

(72) Inventor: Stuart Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 405 days.

(21) Appl. No.: 14/609,075

(22) Filed: Jan. 29, 2015

(65) Prior Publication Data

US 2016/0224689 A1 Aug. 4, 2016

(51) Int. Cl.
| | |
|---|---|
| *H04N 1/405* | (2006.01) |
| *H04N 1/52* | (2006.01) |
| *G06K 15/02* | (2006.01) |
| *B29C 67/00* | (2017.01) |
| *G06F 17/50* | (2006.01) |
| *B33Y 50/02* | (2015.01) |
| *B33Y 30/00* | (2015.01) |
| *B33Y 10/00* | (2015.01) |

(52) U.S. Cl.
CPC ....... *H04N 1/4051* (2013.01); *B29C 67/0059* (2013.01); *B29C 67/0088* (2013.01); *B33Y 10/00* (2014.12); *B33Y 30/00* (2014.12); *B33Y 50/02* (2014.12); *G06F 17/50* (2013.01); *G06K 15/1881* (2013.01); *H04N 1/52* (2013.01)

(58) Field of Classification Search
None
See application file for complete search history.

(56) References Cited

U.S. PATENT DOCUMENTS

| | | |
|---|---|---|
| 5,673,121 A | 9/1997 | Wang |
| 6,118,935 A | 9/2000 | Samworth |
| 6,212,510 B1 | 4/2001 | Brand |
| 6,433,891 B1 * | 8/2002 | Yu ........................ H04N 1/4051 358/1.9 |
| 7,095,530 B2 | 8/2006 | Mantell et al. |
| 7,136,189 B2 | 11/2006 | Sharma et al. |
| 7,139,101 B2 | 11/2006 | Loce et al. |
| 7,209,883 B2 | 4/2007 | Nefian |
| 7,263,472 B2 | 8/2007 | Porikli |
| 7,280,253 B2 | 10/2007 | Li |
| 7,766,641 B2 | 8/2010 | Silverbrook |

(Continued)

FOREIGN PATENT DOCUMENTS

EP 0 392 728 B1 9/1996

*Primary Examiner* — Scott A Rogers
(74) *Attorney, Agent, or Firm* — Kermit D. Lopez; Luis M. Ortiz; Ortiz & Lopez, PLLC

(57) ABSTRACT

Methods and systems for the in-situ creation of a halftone noise screen layer by layer. Each layer produced is a white noise uniform distributed screen, statistically similar to one generated by a uniform noise function. The generation of each layer, however, is driven by a screen state which is an error based metric on the mean screen threshold. The set of screens produced are not independent of each other; adjacent layers are negatively correlated, while non-adjacent layers are completely uncorrelated. The result of this screen creation is that for any color the variation of coverage across the viewed surface is smaller than the variation produced by randomly generated screen planes. The algorithm is computationally inexpensive and eliminates the need to store multiple screens in memory.

20 Claims, 4 Drawing Sheets

(56) References Cited

U.S. PATENT DOCUMENTS

| | | | |
|---|---|---|---|
| 8,098,880 B2 * | 1/2012 | Wang | H04N 1/32208 |
| | | | 358/3.28 |
| 8,136,154 B2 | 3/2012 | Phoha et al. | |
| 8,345,725 B2 | 1/2013 | Michaels | |
| 8,416,458 B2 | 4/2013 | Wang et al. | |
| 8,767,261 B2 * | 7/2014 | Kakutani | H04N 1/4051 |
| | | | 358/1.9 |
| 8,827,684 B1 | 9/2014 | Schumacher et al. | |
| 8,848,254 B2 | 9/2014 | Hahm et al. | |
| 9,446,556 B2 * | 9/2016 | Hosier | B29C 67/0059 |
| 2017/0028649 A1 * | 2/2017 | Utsunomiya | B33Y 10/00 |
| 2017/0028650 A1 * | 2/2017 | Utsunomiya | B33Y 10/00 |

* cited by examiner

HIDDEN MARKOV MODEL GENERATION OF MULTI-PLANE RANDOM SCREENS

TECHNICAL FIELD

Embodiments are generally related to 3D (three dimensional) printing. Embodiments also relate to the in-situ creation of a halftone noise screen for use in 3D printing and white noise uniform distributed screens and uniform noise functions.

BACKGROUND OF THE INVENTION

Standard imaging utilized either vector halftoning or multiple scalar halftoning to convert contone images into binary pixels of multiple colors. In 3D printing, the halftoning must be performed at multiple (possibly many) layers. One natural extension is to create multiple screens independently and apply a unique one at every layer. The resultant halftoned layered object can possess a larger than desired color variation. A more complicated alternative to avoid the variation is a computationally expensive offline optimization that tries to jointly optimize the screens at multiple layers. This, however, takes significant computing power and requires the number of screens to be known a priori.

The process for creating images for 3D printed objects has significant commonality with producing images on paper (2D) images. Both require the conversion of a contone (i.e., more than 1 bit per pixel per color) image to a collection of cyan, magenta, yellow, and black (CMYK) ink droplets. The major difference is that in the standard image on paper case each location of the image is converted to a CMYK binary recipe while in the 3D printing case there are multiple ink planes. Each plane, however, can have at most only one droplet of CMY or K. The creation of multiple planes can be implemented by diffusing the desired surface image into the interior object layers. The conversion of such planes to binary format can occur by limiting the CMYK at each pixel to 100% area coverage (C+M+Y+K<=100) and then applying standard vector halftoning. [1-4]

In order to perform the vector halftoning, each plane must have a screen (i.e., threshold array) associated with it. Typically the screen designed has a stochastic nature to it; it is not a standard clustered dot design. Given that techniques exist to create stochastic screens for 2D images it is natural to extend that methodology to 3D by creating unique screens for each layer using known methods.

If each layer is independently designed and uniformly distributed (thresholds 1 to N are equally likely), then in the 3D case it is easy to determine the resultant variation that can be expected. For any given gray level, the distribution of the number of ink pixels at a given location (pile height) will have a probability distribution that is described by the binomial distribution indicated in equation (1):

$$p(k) = {_nC_k} a^k (1-a)^{n-k} \qquad (1)$$

In equation (1) above, p(k) represents the probability that the n layers of 3D image has k ink droplets of a given color at a given x,y location and a is the probability of any given droplet being an ink droplet of the given color (e.g., if the contone gray level is 127 in an 8 bit system {max contone level of 255}, a=127/255) and ${_nC_k}$ ("n choose k"): the number of ways to choose k objects from a set of n.

In the binomial distribution the following statistics are well known:

$$\text{mean}(\mu) = n\,a$$

$$\text{std dev}(s) = \{n\,a(1-a)\}^{0.5} \qquad (2)$$

In the formulation of equation (2) above, n represents the number of layers. If the number of layers is sufficiently large (e.g. n>=10), then the binomial distribution can be approximated by a Gaussian distribution with the statistical properties of equation (2). For example, for a 3D object with 10 layers and a 50% area coverage will have pile heights with distribution as in graph 10 of FIG. 1. FIG. 1 illustrates a prior art graph 10 depicting data indicative of ink drop height (x-axis) versus probability (y-axis) and the distribution of ink drop height (or pile height) of a 50% halftone when rendered with independent screen layers.

Clearly it is desirable to create a screen set that is uniformly distributed in each layer (i.e., each layer is a viable 2D screen) yet for all contone gray levels has a smaller spread in pile height distribution function. This will result in a smoother appearing surface image.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for methods and systems for hidden Markov model generation of multi-plane random screens.

It is another aspect of the disclosed embodiments to provide for improved 3D printing methods and systems.

It is yet another aspect of the disclosed embodiments to provide for the production of layers, wherein each layer constitutes a white noise uniform distribution screen.

The aforementioned aspects and other objectives and advantages can now be achieved as described herein. Methods and systems are disclosed for the in-situ creation of a halftone noise screen layer by layer. Each layer produced is a white noise uniform distributed screen, statistically similar to one generated by a uniform noise function. The generation of each layer, however, is driven by a screen state which is an error based metric on the mean screen threshold. The set of screens produced using this method is not independent of each other; adjacent layers are negatively correlated, while non-adjacent layers are completely uncorrelated. The result of this screen creation is that for any color the variation of coverage across the viewed surface is smaller than the variation produced by randomly generated screen planes. The algorithm is computationally inexpensive and eliminates the need to store multiple screens in memory.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

Figure 2:
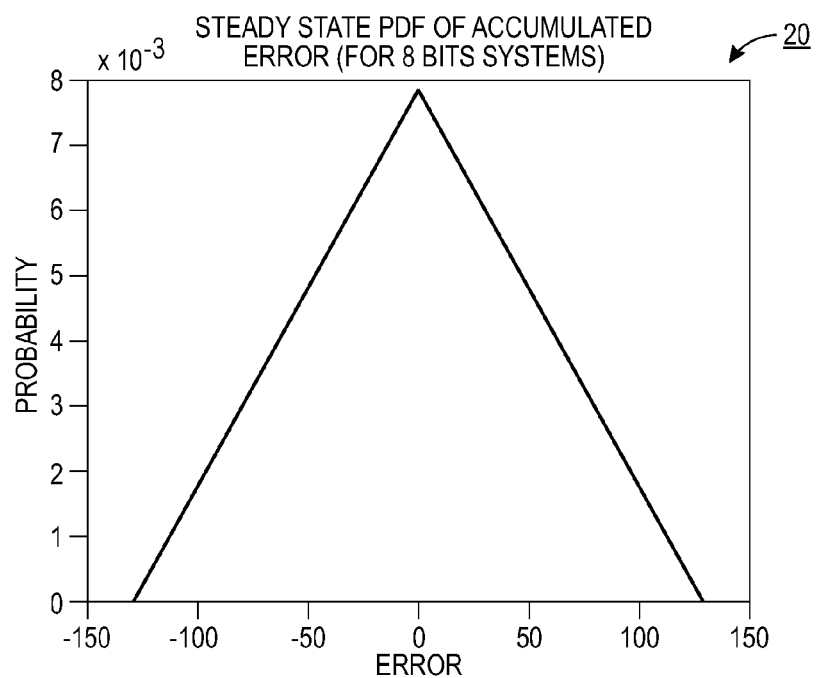
Figure 3:
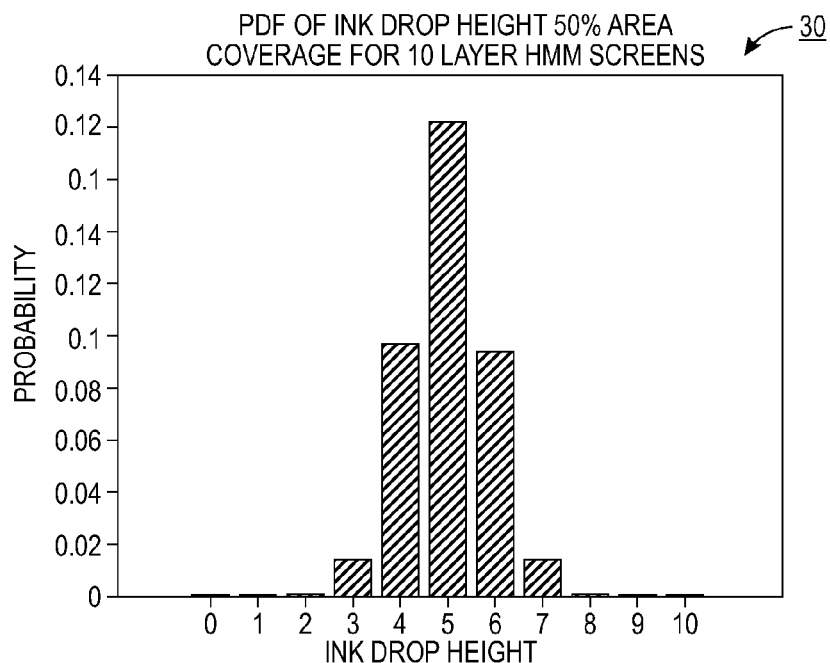
Figure 4:
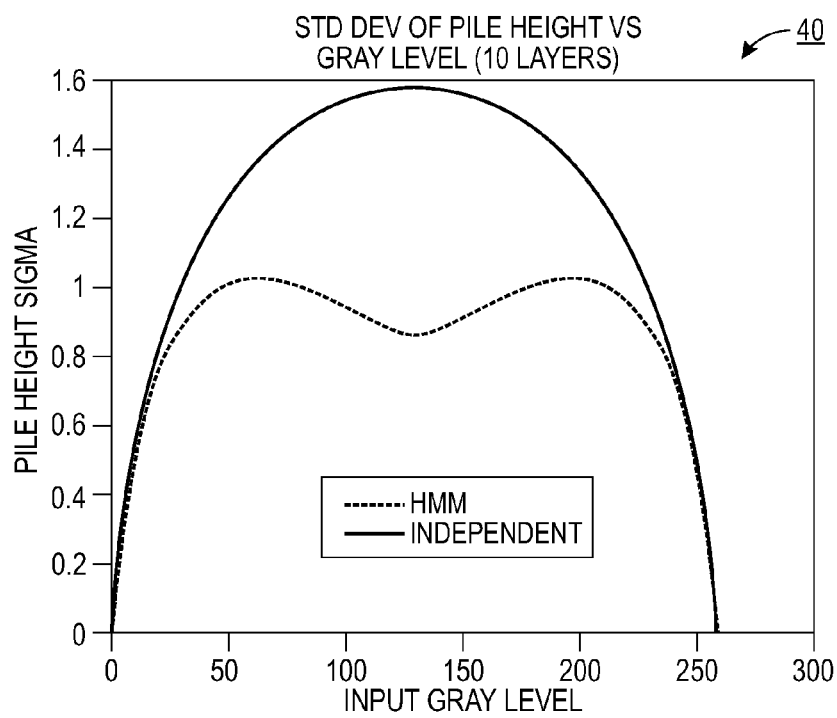
Figure 5:
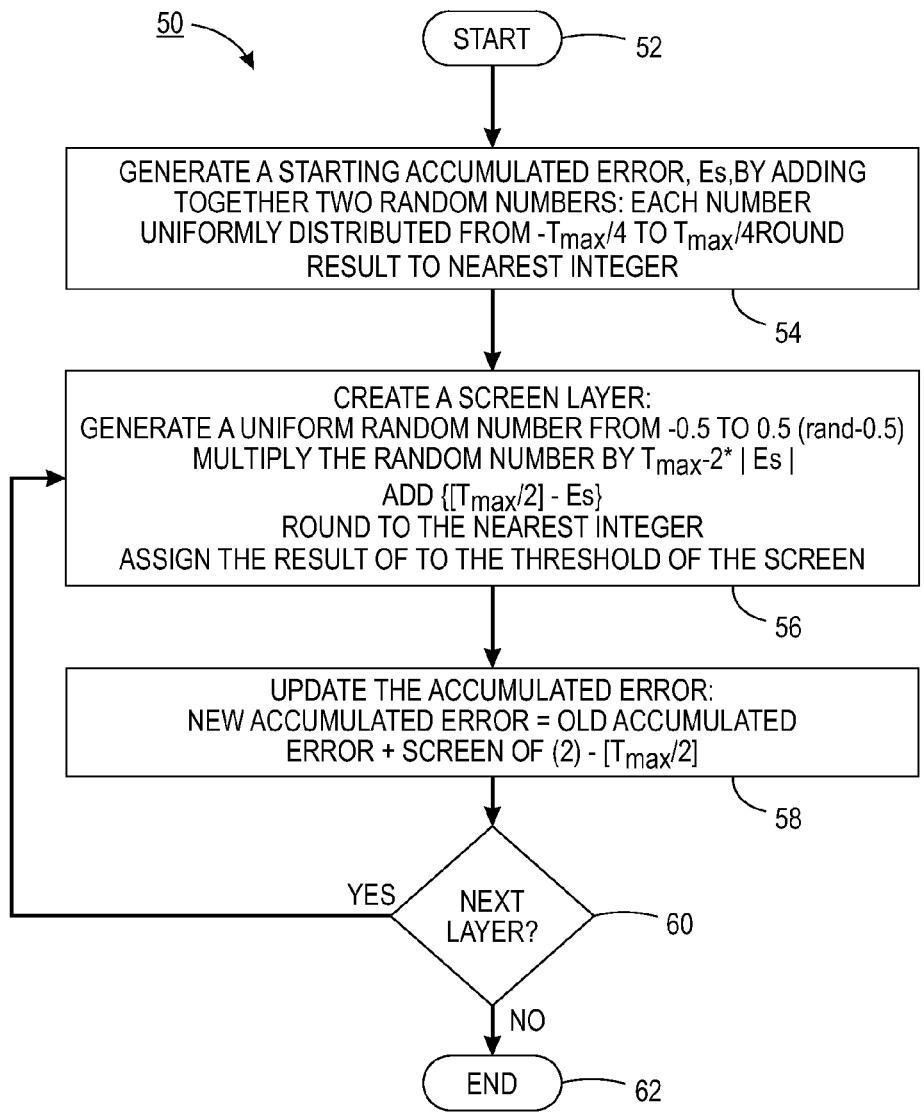
Figure 6:
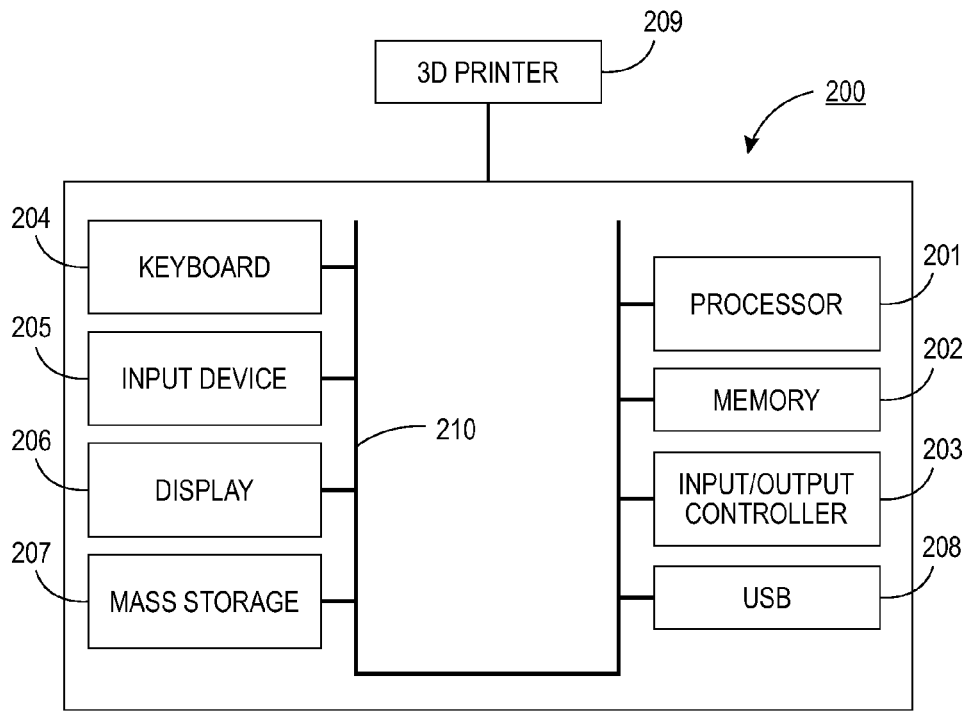
Figure 7:
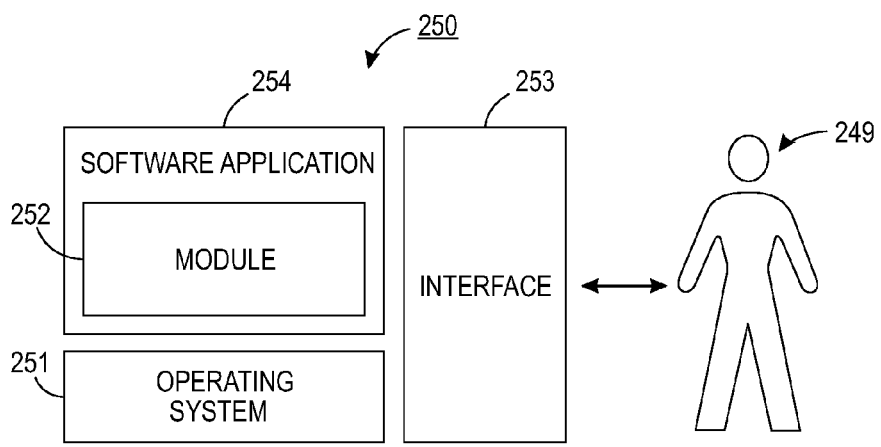

and the distribution of ink drop height (or pile height) of a 50% halftone when rendered with independent screen layers;

FIG. 2 illustrates a graph indicative of an 8 bit system with $T_{max}$ of 255 and a density function that constitutes a triangular function, in accordance with a preferred embodiment;

FIG. 3 illustrates a graph depicting data indicative of the ink drop height produced using the screens generated by disclosed methodology, in accordance with a preferred embodiment;

FIG. 4 illustrates a graph that plots data indicative of the standard deviation of the pile height as a function of input gray level for a ten-layer screen design, in accordance with an alternative example embodiment;

FIG. 5 illustrates a flow chart of operations depicting logical operational steps of a method for HMM generation of multi-plane random screens, in accordance with a preferred embodiment;

FIG. 6 illustrates a schematic view of a computer system, in accordance with an embodiment; and FIG. 7 illustrates a schematic view of a software system including a module, an operating system, and a user interface, in accordance with an embodiment.

DETAILED DESCRIPTION

The particular values and configurations discussed in these non-limiting examples can be varied and are cited merely to illustrate at least one embodiment and are not intended to limit the scope thereof.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing the physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is considered to be in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, where each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

In order to minimize the pile height distribution it is necessary to choose a threshold at a given location that is a function of the previous thresholds at that location. The choice of thresholds can still be random at a given location; it is the probability density function (pdf) of the threshold of that location that changes, thus still providing a uniform distribution of thresholds at each layer.

The parameter that determines the distribution of the current thresholds at a location is chosen as the accumulated mean error of the previous screens. For a screen layer k, the accumulated mean error, Es, is defined as indicated by equations (3a) and (3b):

$$Es(k,x,y)=\Sigma_{i=0}^{k-1}\{S(i,x,y)-u\} \quad (3a)$$

$$Es(k,x,y)=Es(k-1,x,y)+\{S(k-1,x,y)-m\} \quad (3b)$$

In equations (3a) and (3b), S(i,x,y) represents the screen threshold at the ith layer at the location (x,y) and m represents the mean threshold (e.g., m=128 for 8 bit thresholds). Notice that the accumulated error, Es, can be represented either in closed form or iteratively. It is the iterative form that is most useful for in-situ applications.

In order to drive the error of the mean threshold to zero it is desirable to use negative feedback as a control to determine the thresholds in a succeeding layer. For example, in an 8 bit system, if the error Es(k,x0,y0)=33 at screen location (x0,y0) it can be driven to zero by setting the threshold in the next layer (at the same location) to the following as shown in equation (4):

$$S(k,x0,y0)=128-Es(k,x0,y0)=128-33=95 \quad (4)$$

Clearly while this will eliminate the accumulated error at a given position it removes any randomness in the screen and cannot provide any additional screen values past the first random screen, as the error will be zero everywhere after the second layer. What is useful is to have the threshold at x0, y0 in the kth layer be generated from a uniform random number generator with a mean of {128−Es(k,x0,y0)} (or 95 in our above example).

If the mean of a randomly generated threshold is set to 95 and the number is to be uniformly distributed, the number cannot range equally from 0 to 255, as it would if the screen were being independently created, instead a random number generator can be created, which is centered at the desired mean (95) and is selected to have a maximum range. In this example, it has a probability density function of the following, as shown in equation (5):

$$pdf(t)=\{1/189 \text{ if } 1<=t<=189 \text{ 0 otherwise}\} \quad (5)$$

In other words, the threshold can be selected to be uniformly distributed between 1 and 189 (i.e., and a mean value of 95). Note that a threshold in this range will mean that the next accumulated error (using (3a)) will be between {33+(1−128)} and {33+(189−128)} as indicated below in equation (6):

$$-94<=Es(k+1,x,y)<=94 \quad (6)$$

In general it can be shown that the pdf of a threshold at a given layer as a function of the accumulated error using this heuristic of uniform distribution with a mean of 128−Es and maximum variation results in:

$$pdf(t)=\{\text{if } Es>=0, 1/(T_{max}-2*Es), 1<=t<=(T_{max}-2*Es), 0 \text{ otherwise}\} \quad (7)$$

$$\{\text{if } ES<0, 1/(T_{max}+2*Es), (1-2*Es)<=t<=T_{max}, 0 \text{ otherwise}\}$$

In the formulation of equation (7) above, $T_{max}$ represents the maximum threshold (e.g., 255 for 8 bit thresholds). This iterative method always results in a pdf that produces thresholds in the desired range (1 to $T_{max}$). Also, using equations (7) and (3b), it can be shown that the accumulated error is always restricted to be in the following range indicated by equation (8):

$$|Es| <= \lfloor T_{max}/2 \rfloor \qquad (8)$$

Clearly the iterative process of generating screens and updating the accumulated error can be run repeatedly (i.e., multiple layers) resulting in a steady state distribution for the accumulated error of:

$$pdf(Es) = \{2*(\lfloor T_{max}/2 \rfloor - |Es - \lfloor T_{max}/2 \rfloor|) + 1\}/(2*\lfloor T_{max}/2 \rfloor^2 + T_{max}) \text{ for } |Es| <= \lfloor T_{max}/2 \rfloor, 0 \text{ otherwise}$$

In simpler terms, the density function is a triangular function as shown, for example, in FIG. 2, which illustrates a graph 20 depicting data associated with an 8 bit system with $T_{max}$ of 255.

To summarize, the disclosed approach can employ a system measure, Es (the accumulated error), to drive the probabilities of the threshold at the subsequent layer. It can be shown using this methodology that the distribution of thresholds at each layer is very nearly uniform and white, regardless of the initial conditions of Es.

The overall methodology can be described as a hidden Markov model (HMM) system. For an HMM, a system state generates (or emits) an output at each iteration. In this instance, the state is the accumulated errors and the emissions are the screens at each layer. The state transitions and emission probabilities are defined by equation (7). The difference between successive states is the emitted screen layer. It is therefore not possible to see the state (i.e., the accumulated error), which makes it an HMM, but the difference between states is observable.

Figure 1:
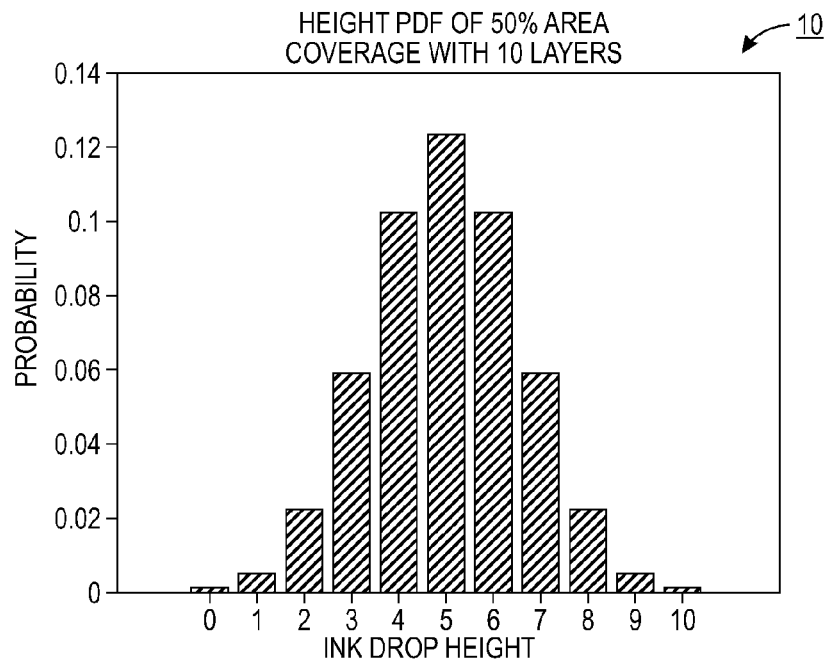
FIG. 1 illustrates a prior art graph depicting data indicative of ink drop height (x-axis) versus probability (y-axis)

It turns out the even though successive states (accumulated errors) are uncorrelated, the screens generated are not. Adjacent screen layers are negatively correlated with a correlation factor of −0.5, while non-adjacent screens are uncorrelated. It is the correlation that provides the significant benefit: the variation of pile height for any given input gray level is reduced when compared to independently generated layers. For example, recall that graph 10 of FIG. 1 shows the distribution of ink drop height (or pile height) of the 50% halftone when rendered with independent screen layers. Note that this ink drop height distribution is independent of the screen layer frequency distribution; it will be the same for white noise screens or blue noise screens. It is that the screen layers are independently, and not jointly, designed that is the underlying cause of this variation (i.e., ink drop height distribution).

FIG. 3 illustrates a graph 30 depicting data indicative of the ink drop height produced using the screens generated by disclosed methodology, in accordance with a preferred embodiment. Note that the variation around the mean ink drop height is significantly reduced when compared with FIG. 1.

Measured as a standard deviation, the independently designed screens result in a drop height variation with standard deviation of 1.58 while the HMM designed screens result in a drop height variation with standard deviation of 0.88 for the 10 layer 50% area coverage case. In general, as the number of layers increases, the variation at 50% area coverage is about ½ as large with the HMM designed screens as compared to the independently created screens. FIG. 4 illustrates a graph 40 that plots data indicative of the standard deviation of the pile height as a function of input gray level for a 10 layer screen design, in accordance with an alternative embodiment.

One of the major benefits of the disclosed embodiments is that such embodiments, alternative and preferred, can be implemented real time in a product to determine the screen applied at a given layer. The disclosed approach can be implemented in some cases as a real time algorithm generating screens because of its computational simplicity. The disclosed method and system only requires that the accumulated errors, Es, are retained between layers—the complete history of every screen is not required. Additionally, all that is necessary to generate a screen threshold at a given layer is a uniform random number generator, which is readily available in virtually all software languages.

Note that most of the analysis performed occurs when the HMM has attained a steady state—when the accumulated error, Es, has a triangular distribution as shown in, for example, graph 20 of FIG. 2. It is possible to quickly reach the steady state of the HMM by iterating several times from a zero accumulated error start point. A more efficient way to reach steady state is to generate a starting Es generated using the known steady state distribution. A triangular distribution can be obtained by adding together two independent random numbers that are each uniformly distributed. As noted previously, a uniform random number generator is available for virtually all programming languages. The "seed" of this iterative process, therefore, starts with just the addition of 2 random numbers at every screen location.

The overall process can be summarized as follows:
1) Generate a starting accumulated error, Es, by adding together two random numbers
   a. Each number uniformly distributed from $-T_{max}/4$ to $T_{max}/4$
   b. Round result to nearest integer
2) Create a screen layer
   a. Generate a uniform random number from −0.5 to 0.5 (rand−0.5)
   b. Multiply the random number of (a) by $T_{max}-2*|Es|$
   c. Add $\{\lceil T_{max}/2\epsilon - Es\}$ to (c) (move its mean there)
   d. Round to the nearest integer
   e. Assign the result of (d) to the threshold of the screen
3) Update the accumulated Error
   a. New accumulated error=old accumulated error+ screen of (2)−$\lceil T_{max}/2 \rceil$
4) Go to (2) for the next layer FIG. 5 illustrates a flow chart of operations depicting logical operational steps of a method 50 for HMM generation of multi-plane random screens, in accordance with a preferred embodiment. As shown at block 52, the process can be initiated. Then, as depicted at block 54, a step or logical operation can be implemented to generate a starting accumulated error, Es, by adding together two random numbers. In the operation shown at block 54, each number is uniformly distributed from $-T_{max}/4$ to $T_{max}/4$, and the result is rounded to the nearest integer. Next, as depicted at block 56, a step or logical operation can be processed to create a screen layer. The step or logical operation shown at block 56 includes generating a uniform random number from −0.5 to 0.5 (rand−0.5) and multiplying the random number of by $T_{max}-2*|Es|$. Also, $\{\lceil T_{max}/2 \rceil - Es\}$ is added (i.e., move its mean there), a rounding to the nearest integer occurs, and the result is assigned to the threshold of the screen. Next, as shown at block 58, a step or logical operation can be implemented to update the accumulated error. The new accumulated error=old accumulated error+ screen of (block 56)−$\lceil T_{max}/2 \rceil$. A test can then be performed to determine whether or not to go to the next layer. If so, the operations shown at block 60 are performed. The process can then terminate as shown at block 62.

It can be appreciated that the disclosed embodiments are novel and offer a number of advantages. For example, the disclosed embodiments allow for iterative screen generation using a state variable. Such embodiments are also allowed for the dynamic creation of a PDF for thresholds from the state variable, including range modification and centering of random number(s). Additionally, such embodiments offer seeding of the iterative process to eliminate start up computation. The system state can be set to a sample that has a desired triangular distribution.

Advantages of the disclosed embodiments are manifold, including the production of lower variations in surface color of 3D objects than independent screen designs. The layers are negatively correlated, resulting in smaller color variations due to both tighter distributions in ink drop height and attenuated low frequency variation in the object normal direction. The disclosed embodiments also allow for screen creation in real time rather than in offline modes. This can be accomplished in a machine for an unlimited number of layers. The disclosed approach also does not require the number of layers to be known a priori to produce a good set of screens. Each plane is a valid halftone screen—not just the set of screens is valid. Each layer is uniformly distributed. Each layer is also stochastic in nature. The disclosed embodiments are also policeable as adjacent layers are negatively correlated with a correlation of −0.5, but non-adjacent layers are uncorrelated.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the internet utilizing an internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIGS. 6-7 are shown only as exemplary diagrams of data-processing environments in which embodiments may be implemented. It should be appreciated that FIGS. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, some embodiments may be implemented in the context of a data-processing system 200 that can include one or more processors such as processor 201, a memory 202, an input/output controller 203, a peripheral USB—Universal Serial Bus connection 208, a keyboard 204, an input device 205 (e.g., a pointing device, such as a mouse, track ball, pen device, etc.), a display 206, and in some cases, mass storage 207. In some embodiments, the system 200 can communicate with a rendering device such as, for example, a 3D printer 209, to render 3D objects.

As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be implemented as, for example, a server in a client-server based network (e.g., the internet) or can be implemented in the context of a client and a server (i.e., where aspects are practiced on the client and the server). Data-processing system 200 may be, for example, a standalone desktop computer, a laptop computer, a Smartphone, a pad computing device and so on.

FIG. 7 illustrates a computer software system 250 for directing the operation of the data-processing system 200 depicted in FIG. 6. Software application 254, stored for example in memory 202, generally includes a kernel or operating system 251 and a shell or interface 253. One or more application programs, such as software application 254, may be "loaded" (i.e., transferred from, for example, mass storage 207 or other memory location into the memory 201) for execution by the data-processing system 200. The data-processing system 200 can receive user commands and data through the interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module(s) 252 that can, for example, implement instructions or operations such as those shown at blocks 52, 54, 56, 58, 60, and 52 of method 50 in FIG. 5 and described elsewhere herein. In some example embodiments, module 252 may function as an image-processing module.

The following discussion is intended to provide a brief, general description of suitable computing environments in which the system and method may be implemented. Although not required, the disclosed embodiments will be described in the general context of computer-executable instructions, such as program modules being executed by a single computer, in most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 6-7 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed. For example, in one embodiment, a method can be implemented for the generation of multi-plane random screens. Such a method can include the steps or logical operations of, for example, generating one or more layers among a plurality of layers, the layer(s) comprising a white noise uniform distributed screen that is statistically similar to a layer generated by a uniform noise function, wherein generating of the layer (or layers) is driven by a screen state that is an error based metric on a mean screen threshold; producing a set of white noise uniform distributed screens wherein each screen among the set of white noise uniform distributed screens are not independent of one another and adjacent layers among the plurality of layers are negatively correlated and non-adjacent layers among the plurality of layers are uncorrelated; and creating in-situ one or more halftone noise screens after generating the layer(s) and producing the set of white noise uniform distribution screens, such that for any color a variation of coverage across a viewed surface is smaller than variations produced by randomly generated screen planes.

In another embodiment a step or logical operation can be provided for rendering a 3D object based on the plurality of layers and using the halftone noise screen(s). In still another embodiment, at each layer a state can be associated with every location constituting an accumulated difference an actual threshold and a mean threshold of all previous layers with respect to the layer(s). In yet another embodiment, for one or more locations, a screen location can be determined by a random uniform distribution having a range that is a function of a state of the location (or locations).

In still another embodiment, a step or logical operation can be implemented for generating a state with respect to an initial layer among the plurality of layers utilizing an addition of two independent uniformly distributed random variables to avoid a delay in convergence to a steady state. Note that the state or states at each of the plurality of layers are independent.

In another embodiment, adjacent screen layers among the plurality of layers can be negatively correlated with a coefficient of −0.5 to create tighter ink distributions and create a high frequency variation in direction normal to a surface to allow for less color variations due to ink distance from the surface. In still another embodiment, the screens generated for all of the plurality of layers are uniformly distributed.

In another embodiment, a system for the generation of multi-plane random screens can be implemented. Such a system can include, for example, at least one processor; and a computer-usable medium embodying computer program code, the computer-usable medium capable of communicating with the processor (or processors). The computer program code can include instructions executable by the processor(s) and configured for: generating one or more layers among a plurality of layers, the layer (or layers) comprising a white noise uniform distributed screen that is statistically similar to a layer generated by a uniform noise function, wherein the generating of the layer(s) is driven by a screen state that is an error based metric on a mean screen threshold; producing a set of white noise uniform distributed screens wherein each screen among the set of white noise uniform distributed screens are not independent of one another and adjacent layers among the plurality of layers are negatively correlated and non-adjacent layers among the plurality of layers are uncorrelated; and creating in-situ one or more halftone noise screens after generating the layer(s) and producing the set of white noise uniform distribution screens, such that for any color a variation of coverage across a viewed surface is smaller than variations produced by randomly generated screen planes.

Note that in some system embodiments, such instructions can be further configured for rendering a 3D object based on the plurality of layers and using the halftone noise screen(s). In yet another system embodiment, at each layer among the plurality of layers a state can be associated with every location constituting an accumulated difference an actual threshold and a mean threshold of all previous layers with respect to layer(s). In still another system embodiment, for at least one location, a screen location at the location(s) can be determined by a random uniform distribution having a range that is a function of a state of the location(s).

In another system embodiment, such instructions can be further configured for generating a state with respect to an initial layer among the plurality of layers utilizing an addition of two independent uniformly distributed random variables to avoid a delay in convergence to a steady state. In another system embodiment, the states at each of the plurality of layers are independent. In yet another system embodiment, adjacent screen layers among the plurality of layers can be negatively correlated with a coefficient of −0.5 to create tighter ink distributions and create a high frequency variation in direction normal to a surface to allow for less color variations due to ink distance from the surface. Additionally, in some system embodiments, screens generated for all of the plurality of layers are uniformly distributed.

In yet another embodiment, a system for the generation of multi-plane random screens can be implemented. Such a system can include, for example, at least one processor; and a computer-usable medium embodying computer program code, the computer-usable medium capable of communicating with the processor(s), the computer program code comprising instructions executable by the processors) and configured for: generating at least one layer among a plurality of layers, the layer(s) comprising a white noise uniform distributed screen that is statistically similar to a layer generated by a uniform noise function, wherein generating of the layer (or layers) can be driven by a screen state that is an error based metric on a mean screen threshold; producing a set of white noise uniform distributed screens wherein each screen among the set of white noise uniform distributed screens are not independent of one another and adjacent layers among the plurality of layers are negatively correlated and non-adjacent layers among the plurality of layers are uncorrelated; creating in-situ at least one halftone noise screen after generating the layer(s) and producing the set of white noise uniform distribution screens, such that for any color a variation of coverage across a viewed surface is smaller than variations produced by randomly generated screen planes; and rendering a 3D object based on the plurality of layers and using the halftone noise screen(s). In some system embodiments, a 3D printer can be provided for the rendering of the 3D object. An example of such a 3D printer is shown as 3D printer 209 shown in FIG. 6.

Note that in some embodiments, module 252 shown in FIG. 7 can include instructions for generating one or more layers among a plurality of layers, the layer(s) comprising a white noise uniform distributed screen that is statistically similar to a layer generated by a uniform noise function, wherein generating of the layer (or layers) is driven by a screen state that is an error based metric on a mean screen threshold; producing a set of white noise uniform distributed screens wherein each screen among the set of white noise uniform distributed screens are not independent of one another and adjacent layers among the plurality of layers are negatively correlated and non-adjacent layers among the plurality of layers are uncorrelated; and creating in-situ one or more halftone noise screens after generating the layer(s) and producing the set of white noise uniform distribution screens, such that for any color a variation of coverage across a viewed surface is smaller than variations produced by randomly generated screen planes. Module 252 can also include further instructions such as those described above (e.g., rendering a 3D object based on the plurality of layers and using the halftone noise screen(s), etc.).

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for in-situ creation of halftone noise screens for 3D printing, said method comprising:
   generating at least one layer among a plurality of layers, said at least one layer comprising a white noise uniform distributed screen that is statistically similar to a layer generated by a uniform noise function, wherein said generating of said at least one layer is driven by a screen state that is an error based metric on a mean screen threshold;
   producing a set of white noise uniform distributed screens wherein each screen among said set of white noise uniform distributed screens are not independent of one another and adjacent layers among said plurality of layers are negatively correlated and non-adjacent layers among said plurality of layers are uncorrelated;
   creating in-situ at least one halftone noise screen after generating said at least one layer and producing said set of white noise uniform distribution screens, such that for any color a variation of coverage across a viewed surface is smaller than variations produced by randomly generated screen planes; and
   rendering a 3D object based on said plurality of layers and using said at least one halftone noise screen.

2. The method of claim 1 wherein said 3D object is rendered by a 3D printer.

3. The method of claim 1 wherein at each layer among said plurality of layers a state is associated with every location constituting an accumulated difference an actual threshold and a mean threshold of all previous layers with respect to said at least one layer.

4. The method of claim 1 wherein for at least one location, a screen location at said at least one location is determined by a random uniform distribution having a range that is a function of a state of said at least one location.

5. The method of claim 1 further comprising generating a state with respect to an initial layer among said plurality of layers utilizing an addition of two independent uniformly distributed random variables to avoid a delay in convergence to a steady state.

6. The method of claim 1 wherein a state at each of said plurality of layers is independent.

7. The method of claim 1 wherein adjacent screen layers among said plurality of layers are negatively correlated with a coefficient of −0.5 to create tighter ink distributions and create a high frequency variation in direction normal to a surface to allow for less color variation due to ink distance from said surface.

8. The method of claim 1 wherein screens generated for all of said plurality of layers are uniformly distributed.

9. A system for in-situ creation of halftone noise screens for 3D printing, said system comprising:
   at least one processor; and
   a computer-usable medium embodying computer program code, said computer-usable medium capable of communicating with said at least one processor, said computer program code comprising instructions executable by said at least one processor and configured for:
   generating at least one layer among a plurality of layers, said at least one layer comprising a white noise uniform distributed screen that is statistically similar to a layer generated by a uniform noise function, wherein said generating of said at least one layer is driven by a screen state that is an error based metric on a mean screen threshold;

producing a set of white noise uniform distributed screens wherein each screen among said set of white noise uniform distributed screens are not independent of one another and adjacent layers among said plurality of layers are negatively correlated and non-adjacent layers among said plurality of layers are uncorrelated;

creating in-situ at least one halftone noise screen after generating said at least one layer and producing said set of white noise uniform distribution screens, such that for any color a variation of coverage across a viewed surface is smaller than variations produced by randomly generated screen planes; and rendering a 3D object based on said plurality of layers and using said at least one halftone noise screen.

10. The system of claim 9 further comprising a 3D printer for said rendering said 3D object.

11. The system of claim 9 wherein at each layer among said plurality of layers a state is associated with every location constituting an accumulated difference an actual threshold and a mean threshold of all previous layers with respect to said at least one layer.

12. The system of claim 9 wherein for at least one location, a screen location at said at least one location is determined by a random uniform distribution having a range that is a function of a state of said at least one location.

13. The system of claim 9 wherein said instructions are further configured for generating a state with respect to an initial layer among said plurality of layers utilizing an addition of two independent uniformly distributed random variables to avoid a delay in convergence to a steady state.

14. The system of claim 9 wherein states at each of said plurality of layers is independent.

15. The system of claim 9 wherein adjacent screen layers among said plurality of layers are negatively correlated with a coefficient of −0.5 to create tighter ink distributions and create a high frequency variation in direction normal to a surface to allow for less color variation due to ink distance from said surface.

16. The system of claim 9 wherein screens generated for all of said plurality of layers are uniformly distributed.

17. A system for in-situ creation of halftone noise screens for 3D printing, said system comprising:

at least one processor; and a computer-usable medium embodying computer program code, said computer-usable medium capable of communicating with said at least one processor, said computer program code comprising instructions executable by said at least one processor and configured for:

generating at least one layer among a plurality of layers, said at least one layer comprising a white noise uniform distributed screen that is statistically similar to a layer generated by a uniform noise function, wherein said generating of said at least one layer is driven by a screen state that is an error based metric on a mean screen threshold;

producing a set of white noise uniform distributed screens wherein each screen among said set of white noise uniform distributed screens are not independent of one another and adjacent layers among said plurality of layers are negatively correlated and non-adjacent layers among said plurality of layers are uncorrelated;

creating in-situ at least one halftone noise screen after generating said at least one layer and producing said set of white noise uniform distribution screens, such that for any color a variation of coverage across a viewed surface is smaller than variations produced by randomly generated screen planes; and rendering a 3D object based on said plurality of layers and using said at least one halftone noise screen.

18. The system of claim 17 further comprising a 3D printer for said rendering of said 3D object.

19. The system of claim 17 wherein:

at each layer among said plurality of layers a state is associated with every location constituting an accumulated difference an actual threshold and a mean threshold of all previous layers with respect to said at least one layer; and for at least one location, a screen location at said at least one location is determined by a random uniform distribution having a range that is a function of a state of said at least one location.

20. The system of claim 17 wherein said instructions are further configured for generating a state with respect to an initial layer among said plurality of layers utilizing an addition of two independent uniformly distributed random variables to avoid a convergence to a steady state.

* * * * *